United States Patent Office

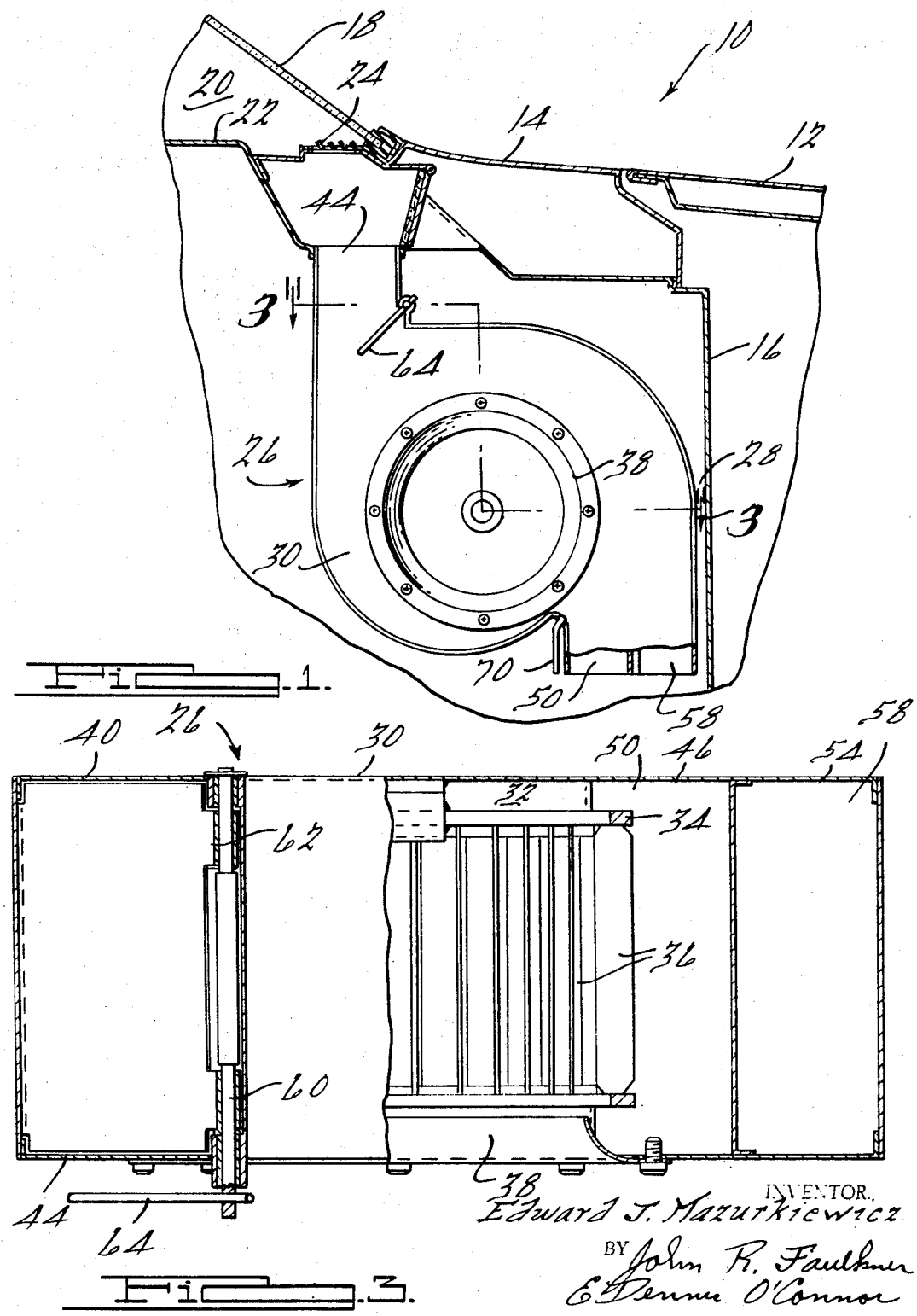

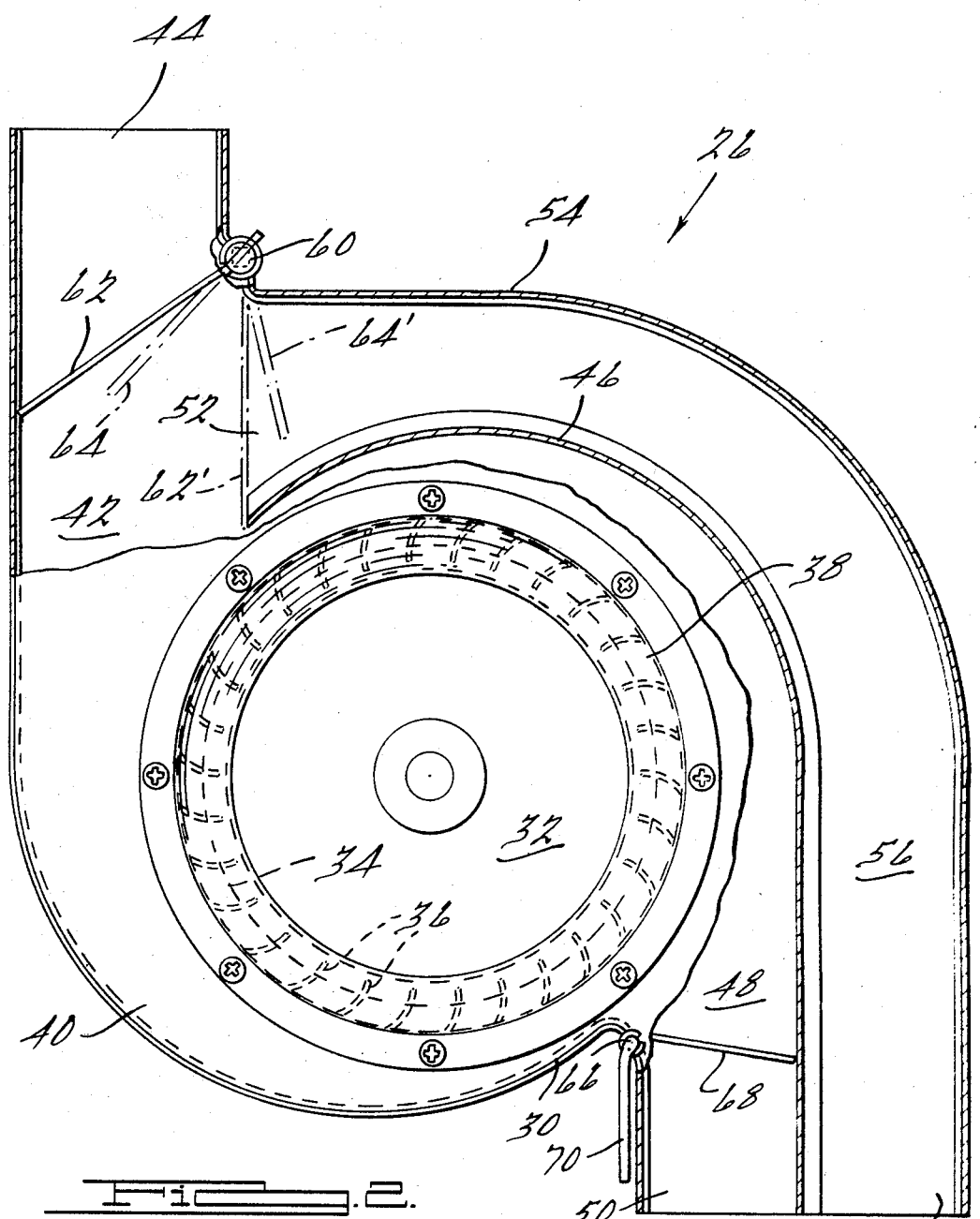

3,472,146
Patented Oct. 14, 1969

3,472,146
FLUID PRESSURIZING AND DISTRIBUTING APPARATUS FOR VEHICLES
Edward J. Mazurkiewicz, Dearborn Heights, Mich., assignor to Ford Motor Company, Dearborn, Mich., a corporation of Delaware
Filed Aug. 11, 1967, Ser. No. 660,012
Int. Cl. B60h 1/26; F04d 25/08
U.S. Cl. 98—2          6 Claims

ABSTRACT OF THE DISCLOSURE

Apparatus for pressurizing and distributing a fluid such as air, and adapted for utilization in a motor vehicle climate control system. The apparatus includes a fan housing having an integrally formed pair of scroll segments terminating in outlet apertures. An inlet opening in the housing permits the entry of fluid to a central chamber wherein rotatable blower means are mounted. The blower means force air in the central chamber through passageways partially defined by the scroll segments. Auxiliary housing means and valve means, the latter positioned in the passageways, permit infinite variances of the volume of fluid exiting the housing through the exit apertures.

Background of the invention

Conventional fluid pressurizing and distributing devices, such as the fans utilized in the climate control systems of motor vehicles, include a housing having a scroll portion defining a passageway terminating in a fluid exit aperture. The portion of the housing formed in the shape of a scroll segment allows a blower element located within the housing to collect and pressurize fluid to be forced through the exit aperture. In a vehicular application of such apparatus, such an arrangement, including but a single exit aperture, necessitates the provision of extensive air ducts so that air forced through the exit aperture may be distributed between defrosting ducts positioned such that air passing therethrough impinges on the interior of the vehicle windshield and heating-air conditioning ducts positioned near the floor of the vehicle and distributing heated or cooled air into the vehicle passenger compartment.

It is an object of this invention to provide fluid pressurizing and distributing apparatus that may be used as the fan assembly in a motor vehicle climate control system. Such apparatus includes a housing having multiple scroll segments terminating in a plurality of exit apertures. This arrangement allows air passing through the apparatus to be distributed both against the interior of the vehicle windshield for defrosting purposes and into the vehicle passenger compartment near the floor portion thereof without the necessity for extensive air ducts. The elimination of such ducts greatly simplifies the design and assembly of the motor vehicle components proximate the fire wall—a crowded and oft times cluttered area. The attendent simplification of design and manufacturing steps leads to reliability of operation and a decrease in manufacturing expense.

Summary of the invention

Apparatus for pressurizing and distributing a fluid such as air and constructed in accordance with this invention includes a housing defining a generally arcuate central chamber. A rotatable blower adapted to be driven by a suitable power source is mounted within the central chamber. Formed in the housing is an inlet aperture permitting the entry of fluid into the central chamber from exterior of the housing. A first portion of the housing is formed in the shape of a scroll segment and partially defines a first fluid passageway communicating between the central chamber and exterior of the housing. A second portion of the housing is formed in the shape of a scroll segment and partially defines a second fluid passageway communicating between the central chamber and exterior of the housing. Valve means are located in the first and second passageways and control the passage of fluid through these passageways. Auxiliary housing means are secured to the housing and define therewith a third fluid passageway communicating between the first passageway and exterior of the housing. The end of the third passageway remote from the first passageway is located adjacent the second passageway.

Description of the drawings

FIGURE 1 is a side elevation view, partially in section, of a portion of a motor vehicle having the fluid pressurizing and distributing apparatus of this invention as part of the vehicle climate control system;

FIGURE 2 is an enlarged sectional view of the fluid pressurizing and distributing apparatus illustrated in FIGURE 1; and FIGURE 3 is an enlarged sectional view, having parts broken away, taken along the line 3—3 of FIGURE 1.

Detailed description of the invention

Referring now in detail to the drawings and in particular to FIGURE 1 thereof, the numeral 10 denotes generally a motor vehicle having a hood panel 12, cowl 14, and a fire wall 16. A transparent windshield panel 18 partially defines a passenger compartment 20 wherein is located a dash panel assembly 22 having defroster air vents 24 extending therethrough. A fluid pressurizing and distributing apparatus 26 is, in the application illustrated, the fan of the vehicle climate control system, and is secured to fire wall 16 by means of fasteners 28 (one illustrated).

Referring to FIGURES 2 and 3 wherein the details of fluid pressurizing and distributing apparatus or fan 26 are illustrated, it may be seen that this apparatus includes a housing 30 defining a central chamber 32. Within chamber 32 a blower element 34 is rotatably mounted. This blower element is of the conventional cage type and includes impeller blades 36. The blower element 34 may be rotated by conventional motor means that comprise no part of this invention. An inlet opening 38 is formed in a side wall of housing 30 to permit the entry of fluid, such as heated or cooled air in the automotive application of the invention illustrated, into central chamber 32.

Housing 30, that may be fabricated from individual stamped parts or other suitable elements, includes a first scroll segment 40 partially defining a fluid passageway 42 that extends from chamber 32 and terminates in a discharge aperture 44. A second portion of housing 30 is formed in the shape of a scroll segment 46 partially defining a second fluid passageway 48 that extends from chamber 32 and terminates in a discharge aperture 50.

In the preferred embodiment of the invention illustrated, scroll segment housing portions 40 and 46 each extend through arcs of 180° about the periphery of central chamber 32. Such an arrangement provides that during the operation of this apparatus, the volume of fluid passing through entrance aperture 38 and central chamber 32 will be equally divided between fluid passageways 42 and 48. It is to be understood, however, that variances in the arcs through which segment portions 40 and 46 extend could be utilized without departing from this invention.

As clearly illustrated in FIGURE 2, a side wall of fluid passageway 42 has formed therethrough an opening 52. Auxiliary housing means 54, secured to housing 30, define with housing portion 46 a fluid passageway 56. One end of passageway 56 registers with opening 52 in a side wall of passageway 42 and the end of passageway 56 remote from opening 52 terminates in an exit aperture 58. It may be observed that exit aperture 58 is adjacent exit aperture 50 and that fluid flowing through exit aperture 50 and fluid flowing through exit aperture 58 are directed in an identical direction.

A rotatable valve shaft 60 is journalled in housing 30 near the intersection of fluid passageways 42 and 56. Secured to shaft 60 for unitary movement therewith are a valve element 62 located within the passageway 42, and an operating lever 64 located externally of housing 30. A second rotatable valve shaft 66 is journalled in housing 30 and has attached thereto a valve element 68 positioned for movement within fluid passageway 48. An externally mounted valve operating lever 70 also is secured for unitary movement with shaft 66. Conventional control means such as operating cables or levers may be secured to valve operating levers 64 and 70 in a manner well known in the automotive art so that manipulation by the vehicle operator of control means located within the vehicle passenger compartment causes a movement of actuating levers 64 and 70 and a corresponding movement of valve elements 62 and 68.

It may be seen from FIGURE 1 that apparatus 26 is orientated within the vehicle 10 such that fluid exiting apparatus 26 through exit aperture 44 is directed upwardly and will pass through defroster air vents 24 and impinge upon the interior surface of windshield 18, thereby performing the desired defrosting function. Air exiting apparatus 26 through exit apertures 50 and 58 is directed downward and will impinge upon the floor member of the vehicle passenger compartment and thereafter be distributed throughout the passenger compartment. In motor vehicles having a drive line tunnel extending through the vehicle passenger compartment, fluid exiting apparatus 26 through exit apertures 50 and 58 may be impinged upon the drive line tunnel and thereby distributed on both sides thereof within the passenger compartment.

During periods of operation of the motor vehicle climate control system, heated or cooled air will enter central chamber 32 through inlet aperture 38. Due to the rotation of blower element 34, this air will be thrown outwardly from central chamber 32 and will be forced along passageways 42 and 48. The percentage distribution of such air for heating and/or defrosting purposes is infinitely variable. For example, when valve element 62 is in the position illustrated in FIGURE 2, passageway 42 is effectively blocked and no air will exit housing 30 through exit aperture 44. All air forced along passageway 42 will be deflected by valve element 62 through fluid passageways 56 and will exit apparatus 26 via exit aperture 58. Assuming valve element 68 to be open to allow the passage of air along fluid passageway 48 and through exit aperture 50 when valve element 62 is in the position illustrated in FIGURE 2, all of the air passing through apparatus 26 will be directed toward the floor of the vehicle passenger compartment.

If, however, an external force if brought to bear against valve operating lever 64 urging this lever into the position 64' shown in ghost in FIGURE 6 and causing a corresponding movement of valve element 62 into the position 62' shown in ghost in FIGURE 2, opening 52 is effectively blocked and no air passes through fluid passageway 56. Therefore, all of the air driven by blower 34 through passageway 52 will exit apparatus 26 through exit aperture 44 to defrost the interior of the vehicle windshield. If, when valve element 62 is in the position 62', valve element 68 is in the position 62', valve element 68 is in the position illustrated wherein it blocks fluid passageway 48 and permits passage of air through exit aperture 50, all of the air passing through apparatus 26 will be directed against the vehicle windshield for defrosting function.

It readily may be understood that an infinite variation of valve positions is possible to give any desired distribution of air for defrosting and/or passenger compartment climatizing functions as desired by the external climatic conditions surrounding the motor vehicle.

It may thus be seen that this invention provides a fluid pressurizing and distributing apparatus particularly adapted for use as a fan in climate control mechanism of a motor vehicle. When oriented for such a vehicular application the apparatus of this invention provides for fluid discharge in both vertical directions to perform the functions of defrosting the interior surface of the vehicle windshield and to climatize the interior of the motor vehicle passenger compartment.

It is to be understood that this invention is not limited to the exact construction illustrated and described above or the abstract preceding this specification, but that various changes and modifications may be made without departing from the spirit and scope of the invention as defined by the following claims.

I claim:
1. Apparatus for pressurizing and distributing a fluid such as air, said apparatus comprising a housing defining a generally arcuate central chamber, said housing having inlet aperture means formed therethrough permitting the entry of fluid into said chamber from exterior of said housing, a first portion of said housing being formed in the shape of a scroll segment and partially defining a first fluid passageway between said chamber and exterior of said apparatus and terminating in a first exit aperture remote from said chamber, a second portion of said housing being formed in the shape of a scroll segment and partially defining a second fluid passageway between said chamber and exterior of said apparatus and terminating in a second exit aperture remote from said chamber, rotatable blower means mounted on said housing and positioned within said chamber and capable of forcing fluid in said chamber through said passageways, said first passageway having an opening therein intermediate its ends, and structural means operatively secured to said housing and cooperating with the second portion of said housing to define a third fluid passageway registering with said opening, communicating between said first passageway and exterior of said apparatus and terminating in a third exit aperture remote from said first passageway, said third exit aperture being adjacent said second exit aperture.

2. Apparatus according to claim 1, wherein each of said housing portions extends through an arc of 180° about said chamber.

3. Apparatus according to claim 1, including valve means secured to said housing at the intersection of said first and third passageways and apportioning fluid flowing from said chamber between said first and third passageways.

4. Apparatus according to claim 2, including second valve means secured to said housing proximate said second exit aperture and regulating the flow of fluid through said second aperture.

5. In a motor vehicle having body structure, a windshield and a passenger compartment having a floor, a device for pressurizing and distributing a gas such as air and comprising a housing defining a central chamber and having a pair of scroll portions, each of said scroll portions partially defining one of a pair of passageways from said chamber to a pair of exit apertures, said housing having an opening therein permitting the entry of gas into said chamber, rotatable blower means mounted in said chamber and capable of forcing gas entering said chamber against said scroll portions and through said passageways, and structural means secured to said housing and cooperating with one of said scroll portions to define a gas conduit from one of said pair of passageways to exterior of said housing, and valve means located at the intersection of said one passageway and said gas conduit and apportioning the volume of gas flowing through said one passageway and said conduit, the gas exiting through one of said exit apertures being directed in a direction opposite to the direction of the gas exiting from the other of said exit apertures, said housing being secured to said body structure, the gas passing through one of said exit apertures being directed towards said windshield, the gas passing through the other of said exit apertures being directed towards said passenger compartment floor.

6. In a motor vehicle having body structure, a windshield and a passenger compartment having a floor, apparatus for pressurizing and distributing fluid comprising a housing defining a generally arcuate central chamber, a rotatable blower mounted within said chamber, said housing having inlet aperture means formed therethrough permitting the entry of fluid into said chamber from exterior of said housing, a first portion of said housing being formed in the shape of a scroll segment and partially defining a first fluid passageway communicating between said chamber and a first exit aperture, a second portion of said housing being formed in the shape of a scroll segment and partially defining a second fluid passageway communicating between said chamber and a second exit aperture, valve means operative to control the passage of fluid through each of said passageways, the fluid passing through said first exit aperture moving in a direction opposite to the direction of the fluid passing through said second exit aperture, said housing being secured to said body structure, the fluid passing through one of said exit apertures being directed towards said windshield, the fluid passing through the other of said exit apertures being directed towards said passenger compartment floor, and auxiliary housing means secured to said housing and defining therewith a third fluid passageway communicating between said first passageway and exterior of said housing, the end of said third passageway remote from said first passageway being adjacent said second passageway.

References Cited

UNITED STATES PATENTS

| | | | |
|---|---|---|---|
| 694,588 | 3/1902 | Tyler | 230—47 |
| 815,674 | 3/1906 | Bent | 230—47 |
| 2,330,938 | 10/1943 | Williams | 230—47 |

FOREIGN PATENTS 704,292   2/1965   Canada.

MEYER PERLIN, Primary Examiner

U.S. Cl. X.R.

230—47